United States Patent
Contolini et al.

(10) Patent No.: US 6,643,620 B1
(45) Date of Patent: Nov. 4, 2003

(54) VOICE ACTIVATED CONTROLLER FOR RECORDING AND RETRIEVING AUDIO/VIDEO PROGRAMS

(75) Inventors: Matteo Contolini, Santa Barbara, CA (US); Jean-Claude Junqua, Santa Barbara, CA (US); Roland Kuhn, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/270,262

(22) Filed: Mar. 15, 1999

(51) Int. Cl.[7] .......................... G10L 15/00; G10L 15/18
(52) U.S. Cl. ........................ 704/270; 704/257
(58) Field of Search ................. 704/270, 275, 704/257; 707/3, 104.1; 384/96, 97

(56) References Cited

U.S. PATENT DOCUMENTS

| | | | | |
|---|---|---|---|---|
| 4,873,584 A | | 10/1989 | Hashimoto | 386/83 |
| 5,293,357 A | | 3/1994 | Hallenbeck | 725/39 |
| 5,475,835 A | | 12/1995 | Hickey | 707/104.1 |
| 5,774,859 A | * | 6/1998 | Houser et al. | 704/275 |
| 5,812,977 A | * | 9/1998 | Douglas | 704/275 |
| 5,832,439 A | * | 11/1998 | Cox et al. | 704/275 |
| 5,835,667 A | * | 11/1998 | Wactlar et al. | 386/96 |
| 6,167,395 A | * | 12/2000 | Beck et al. | 707/3 |
| 6,324,512 B1 | * | 11/2001 | Junqua et al. | 704/275 |

OTHER PUBLICATIONS

Rowden, Speech Processing, 1992, McGraw–Hill Book Company Europe, pp. 383–385.*

Earley, "An Efficient Context–Free Parsing Algorithm", Communications of the ACM, vol. 13, No. 2, Feb. 1970, pp. 94–102.*

* cited by examiner

*Primary Examiner*—David D. Knepper
(74) *Attorney, Agent, or Firm*—Harness, Dickey & Pierce, PLC

(57) ABSTRACT

The system includes a database of program records representing A/V programs which are available for recording. The system also includes an A/V recording device for receiving a recording command and recording the A/V program. A speech recognizer is provided for receiving the spoken request and translating the spoken request into a text stream having a plurality of words. A natural language processor receives the text stream and processes the words for resolving a semantic content of the spoken request. The natural language processor places the meaning of the words into a task frame having a plurality of key word slots. A dialogue system analyzes the task frame for determining if a sufficient number of key word slots have been filled and prompts the user for additional information for filling empty slots. The dialogue system searches the database of program records using the key words placed within the task frame for selecting the A/V program and generating the recording command for use by the A/V recording device.

11 Claims, 3 Drawing Sheets

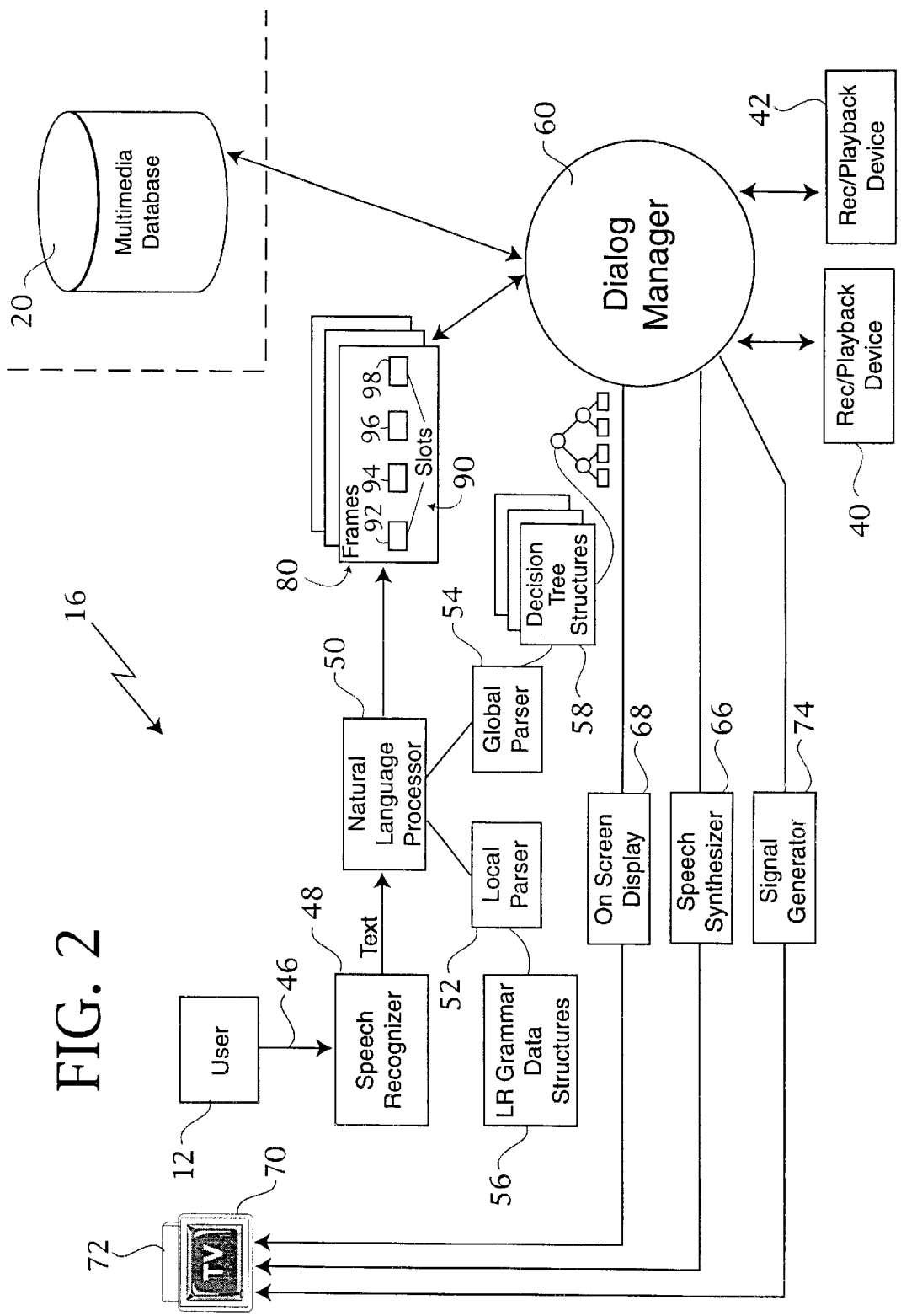

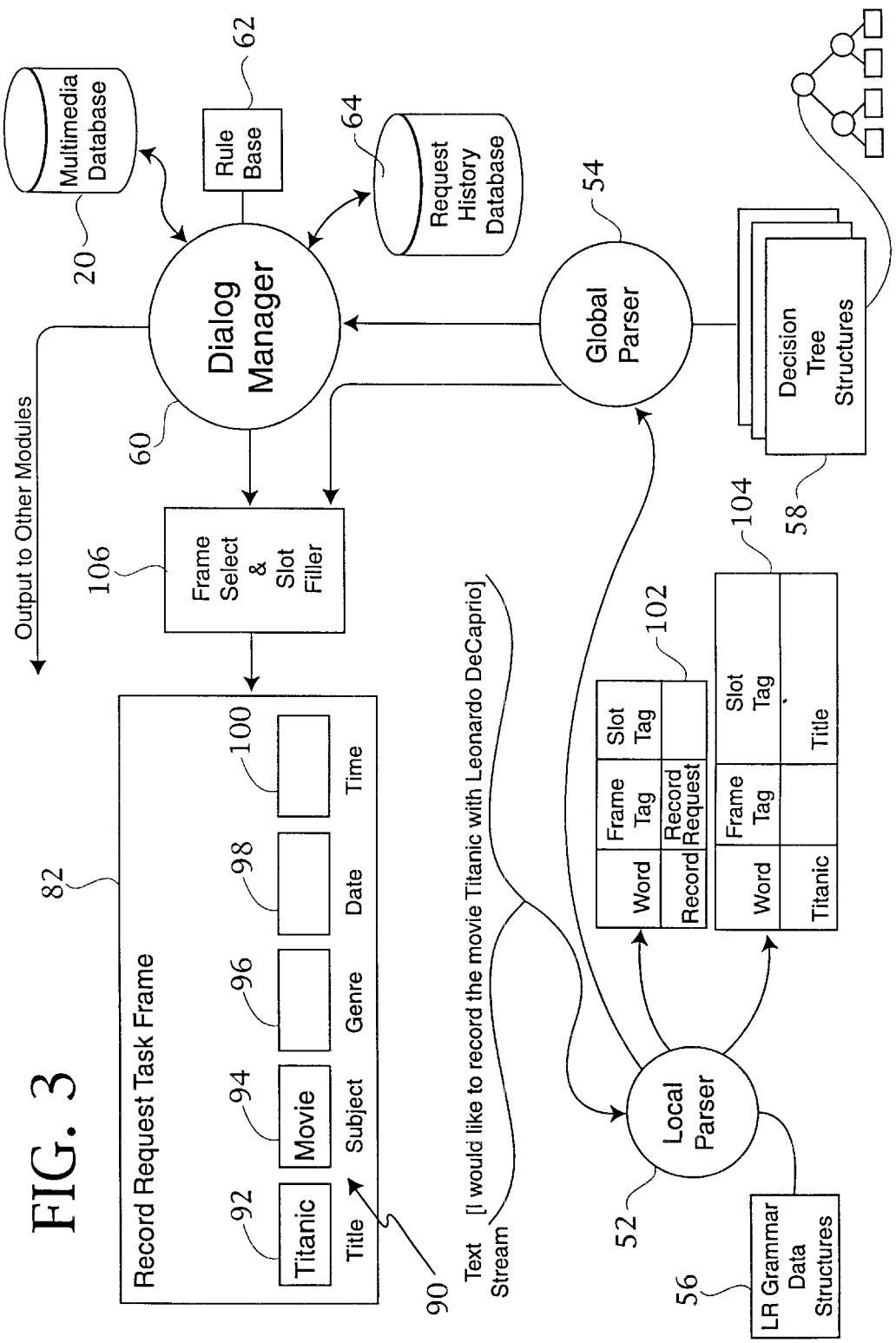

VOICE ACTIVATED CONTROLLER FOR RECORDING AND RETRIEVING AUDIO/VIDEO PROGRAMS

BACKGROUND AND SUMMARY OF THE INVENTION

The present invention is directed to a voice controlled system for recording and retrieving audio/video programs. More particularly, the present invention is directed to a voice controlled multimedia system for receiving and processing spoken requests against a multimedia database comprising electronic programming guide information for recording and retrieving the audio/video programs.

The next generation televisions and related accessories (set-top box, VCR, audio/video processor, satellite or cable receiver, etc.) will have significant processing power made available by a CPU or DSP. This processing power can be used to support tasks which are very different from what the device was originally intended for (mainly decoding and processing the video and audio signals), so that the unit can be enhanced with various functions at little or no cost for the manufacturer.

However, systems which utilize a voice activated controller for programming a multimedia database are conspicuously absent from the prior art. For example, in U.S. Pat. No. 5,293,357, a method is described for programming an event timer and recording television broadcasts by using an on-line TV schedule listing. The user manually selects the desired program from the on-line listings, and the selection is translated into an event for the timer.

In the present invention, information collected from an electronic programming guide (EPG) or entered by the user, is stored in a program database. The user can then retrieve programs by providing a natural language description of what he or she desires to play back. The recording request programming step can also be accomplished by giving a description in natural language of the desired program to be recorded. Furthermore, the user can program an event even if it is not listed in the EPG available at that time, because the present invention will keep updating the EPG (for example, on weekly or monthly basis) and try to resolve recording requests that are still pending. Another advantage of the present invention is that it can monitor the EPG for a particular set of programs indefinitely. For example, a sports fan can give a complex command like "record all the basketball games featuring the L.A. Lakers," and he or she will be able to record all Lakers game.

In U.S. Pat. No. 4,873,584, a system is described in which a computer controls a VCR and provides means for storing a list of the television programs recorded by the VCR. The system also provides means for playing back the programs on the VCR in any preferred order. However, this system also requires the user to manually enter the recording and play back requests.

In the present invention a computer is not needed, and the microprocessor present in a set-top box or an A/V decoder can be used to perform all the functions. In addition, the program schedule listings do not need to be recorded on a floppy disk but can be obtained from a TV channel or from an internet or telephone connection. The device of the present invention can thus be programmed for a potentially unlimited period of time, instead of a week at a time. The present invention also provides means for automatically maintaining a database of the available programs and for retrieving titles using natural language spoken requests and commands.

In U.S. Pat. No. 5,475,835, a computer controls an A/V player/recorder and provides functions for maintaining a home entertainment media inventory. This device uses infrared communication between the computer and the player/recorder. The computer interface is provided by a series of touch screen menus which can be used for controlling and programming the A/V devices. However, the computer does not provide an interface which can accept programming commands in a natural language format.

In the present invention a dedicated computer is not needed, nor is the user required to operate the computer to retrieve programs. Commands presented to the device of the present invention can be given using naturally spoken language and can perform complex operations. A dialogue system can intervene to resolve ambiguities or to prompt the user for additional information.

In view of the foregoing, it is desirable to provide a system which can understand spoken requests and process the user's request against a multimedia database of records. It is further desirable to receive a spoken request to record a desired program and provide a system for searching for the airing time of the requested program in a database of electronic programming guide records. It is also desirable to provide a system which allows a library of multimedia programs to be maintained in the multimedia database and present the system with a spoken request to retrieve a title from the multimedia database. Finally it is desirable to allow the user to update the library of multimedia programs using spoken natural language requests and commands.

The present invention provides a voice controlled system for recording audio/video (A/V) programs using a VCR, DVD or video disc recording device, or any other device capable of storing A/V streams. The present invention also provides a system for retrieving programs from tape, DVD, CD, or any other device capable of playing back A/V media using spoken natural language requests and commands. The invention can also maintain a database of the programs available in a personal multimedia library and provide typical database associated functions such as information retrieval, statistics, and cataloging.

The invention also provides a technique for generating recording requests and building the information and program records in the multimedia database either manually or automatically. Information can be entered manually using an input device (optical reader, by selecting text with a remote control, etc.) or by voice, and then converted into text by a speech recognition system. Information and program records can also be extracted automatically from an electronic program guide (EPG) and can consist in the title, author(s), player(s), summary, description of the program, or any combination thereof. Text information can be classified into two categories: the stored program records which are searched by the system for allowing the user to record A/V programs, and the information used to retrieve A/V programs.

The records forming the multimedia database are stored in a memory device including but not limited to static RAM or a magnetic storage device, and contain a code that uniquely identifies the media (video tape, CD, DVD disk, etc.) and the location of the program within the media (tape position, CD track, etc.). The text within the records can be used to dynamically generate a vocabulary (eventually completed by additional words) utilized by a natural language processor, so that a user can give a spoken, natural language description of the desired program to record retrieve. After processing and understanding the spoken request, the system will record or play back the program that most closely matches the description. If the media is not currently loaded in the playback device (VCR, multi-disc DVD player, etc.), the system of the present invention will provide the user with a way to identify the appropriate media (tape catalog number, title, etc.) and ask the user to load the requested media. The system will then position the media to the desired program and commence playback.

Similarly, the information associated with programs in an EPG can be used for the purpose of selecting a program for unattended recording by an appropriate video recording device. For example, the user gives a spoken description of the desired program which is then converted into text by a speech recognizer. When a program is found in the EPG that matches the description, it is scheduled for recording. In this way, an indefinite period of time can be monitored for recording by the system of the present invention, even if the EPG has a limit time coverage. For example, the user may request something like: "Please record the movie Titanic, with Leonardo De Caprio." If the movie is found in the current listing, the video recording device (VCR or other similar device) is programmed with appropriate starting time, ending time and channel selection. If the movie is not found in the current listings, the request is put on hold until the next listings will be made available, a new search is done and so on. In a similar way, a sports fan can program the recording device in a single step to record all the games featuring his or her preferred team. Thus, the invention allows the user to perform very complex commands in a natural and efficient manner. A dialogue between the user and the multimedia system can be established to resolve ambiguous or incomplete commands.

BRIEF DESCRIPTION OF THE DRAWINGS

Additional objects, advantages, and features of the present invention will become apparent from the following description and appended claims, taken in conjunction with the accompanying drawings in which:

FIG. 2 is a schematic diagram of the natural language processor and dialogue system associated with the voice controlled multimedia system of FIG. 1; and FIG. 3 is a schematic diagram disclosing the speech understanding technique performed by the natural language processor and the dialogue manager shown in FIG. 2.

DETAILED DESCRIPTION OF THE INVENTION

Figure 1:
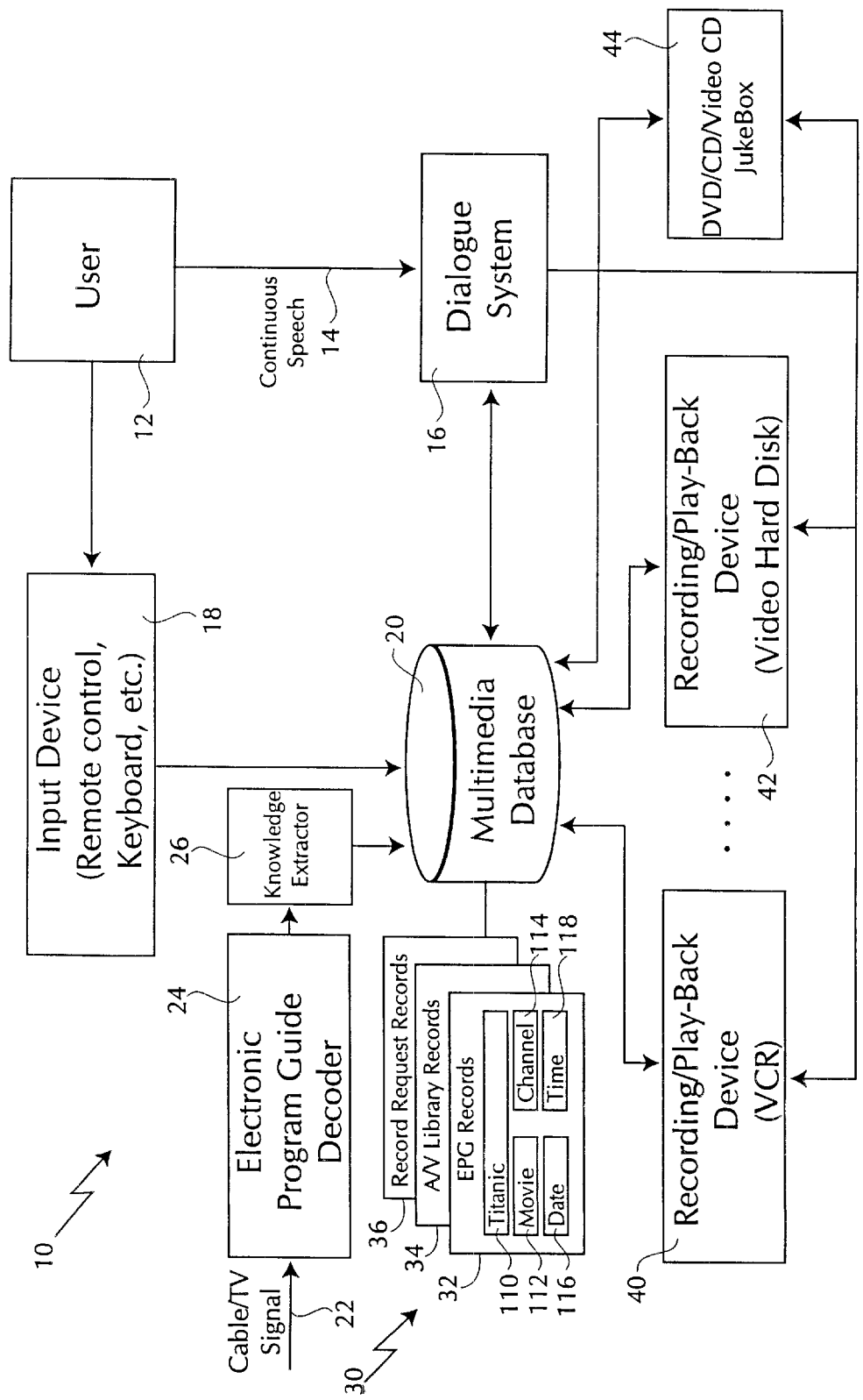
FIG. 1 is a schematic diagram of the voice controlled multimedia system in accordance with a preferred embodiment of the present invention.

In accordance with the teachings of the present invention, a system for receiving and understanding a spoken request and recording and/or retrieving a multimedia program is disclosed. FIG. 1 shows the voice controlled multimedia system 10 according to a preferred embodiment of the present invention. As shown, a user 12 provides the necessary spoken requests and input for operating the voice controlled multimedia system 10. The objective of the user input is to update and program a multimedia database 20. As shown, the user 12 may communicate with the multimedia database 20 by providing spoken requests in the form of continuous speech, represented as input 14, to a dialogue system 16. The dialogue system 16 includes a natural language processor 50, the operation of which is described in greater detail below. The user 12 may also operate an input device 18 for communicating with the multimedia database 20. The input device 18 may be a variety of devices for generating an input text stream, or an input signal for selecting known text for updating or programming the multimedia database 20. Without limitation, the contemplated input devices 18 include a remote control, a keyboard, a pointing device, or a bar code reader.

The multimedia database 20 includes a plurality of records 30. These records 30 can take on a variety of pre-defined data structures. As part of the present invention, the records 30 include electronic programming guide (EPG) records 32 for storing information about the programs which are available for recording or viewing, and A/V media library records 34 which are created by the user or by the recording devices. For example, the user or the recording devices can open new media library records, modify existing records, and delete old records when new programs are recorded over old programs in the multimedia library. The records 30 also include recording request records 36 which are created interactively using either the dialogue system 16 or the input device 18.

For example, the user may purchase several new pre-recorded video and audio disks and wish to add a record of these disks to the multimedia database 20. The user, either via the dialogue system 16 or the input device 18, can enter the relevant information, in as much or little detail as desired to the A/V library record 34 for storage within the multimedia database 20. For a videotape or disk, such information may include title, genre, subject, movie synopsis, director, actors, studio, length, rating.

With continued reference to FIG. 1, a cable, satellite or television signal 22 provides electronic programming guide (EPG) information to the multimedia system 10, although it is contemplated that the EPG information can also be downloaded via a telecommunication line from an internet based service provider or a dedicated dial-up EPG service provider. The television signal 22 is also made available for viewing and/or recording. An EPG decoder 24 receives the EPG information and converts and formats the EPG information into textual information which is communicated to a knowledge extractor 26. The knowledge extractor 26 is responsible for reorganizing the EPG information into a searchable format and generating the EPG records 32 stored within the multimedia database 20 as part of the present invention, the EPG information can also be displayed to the user.

As shown, the searchable EPG program records 32 include a set of predefined fields, such as, but not limited to a program name field 110, a program description or subject matter field 112, a channel field 114, a date field 116, and a time field 118. The multimedia database 20 is continually updated with new program records 32 as the information content of the EPG changes. Therefore, spoken requests can be processed at any time without waiting for updates to the multimedia database 20. In addition, the expired program records 32 within the multimedia database 20 are purged at periodic time intervals so that only a limited and manageable number of program records 32 are searched by the multimedia programming system 10 for satisfying the user's spoken request.

The multimedia database 20 can communicate bi-directionally with a plurality of multimedia recording and playback devices. FIG. 1 shows one or more video cassette or tape recorders 40 in bi-directional communication with the multimedia database 20, a video hard disk playback/recorder 42 in bi-directional communication with the multimedia database 20, and a DVD/CD/video CD jukebox 44 in bi-directional communication with the multimedia database 20. Each of these devices 40, 42, 44 are also capable of receiving commands from the dialogue system 16.

As will be appreciated, a variety of records 30 having different data structures are stored within the multimedia database 20. Each record 30 includes a predefined set of fields such as title/subject, media, and location of the program within the media (i.e. tape position, CD or DVD track). This information is used to dynamically generate a vocabulary which is then used by a suitable speech recognizer 48. The vocabulary is also supplemented with additional words to complete the vocabulary and allow for better understanding of the spoken request. After the vocabulary is completed, the user may give the dialogue system 16 a spoken request using natural language. The spoken request indicates what program the user wants to retrieve and/or record. The dialogue system 16 will process the spoken request in order to understand the semantic content of the request, and in response, the multimedia system 10 will record or play back the program that most closely matches the description eventually prompting the user for confirmation. Additionally, if the media containing the desired program material for play back is not currently loaded in the player device 40, 42, 44, the system will prompt the user 12 with information identifying the appropriate media (tape catalog number, title, etc.) and ask the user to load the media for playback. The invention may also remind the user to load a new media in the recording device if the current media does not have enough free space to store the program scheduled for recording.

Similarly, the information stored within the EPG program records 32 can be used for the purpose of selecting a program for unattended recording. In operation, the user gives a spoken description of the desired program to be recorded. The spoken request is converted into text by the speech recognizer 48. When a matching program is found after searching the EPG program records 32 within the multimedia database 20, it is scheduled for recording. In this way, an indefinite period of time can be monitored for recording by the multimedia system 10 of the present invention, even if the EPG has a limited future time coverage.

For example, the user may present the following request: "Please record the movie Titanic, with Leonardo De Caprio." If the movie is found in the current collection of EPG records 32, the appropriate video recording device 40, 42 is programmed with the starting time, ending time and channel selection. If the movie is not found in the current EPG records 32, the request is put on hold until the next listings will be made available and a new search of the EPG records 32 can be completed. The request is retried until satisfied, or until a predetermined number of search attempts have been made. The request can also be maintained indefinitely. In a similar manner, a sports fan can program the multimedia database 20 and thus the recording device 40, 42 in a single step to record all sporting events featuring his or her preferred team. Thus, the invention allows the user to perform very complex commands in a natural and efficient manner, and with only a limited amount of knowledge of when a particular program will air. A dialogue between the user and the dialogue system 16 can be established to resolve ambiguous or incomplete commands.

The speech processing technique of the multimedia system 10 is disclosed in FIG. 2. More specifically, the spoken request and spoken information represented as user speech at 46 is received by a speech recognizer 48. The spoken words are processed by the speech recognizer 48 and converted into text. A suitable speech recognizer is that taught in Lee, K., Large Vocabulary Speaker Independent Continuous Speech Recognition; The Sphinx Systems, Ph.D. Thesis, Carnegie Mellon University, 1988. The text stream which is output from the speech recognizer 48 is provided to a natural language processor 50, which is primarily responsible for analyzing the text stream and resolving the semantic content and meaning of the spoken request. The speech understanding analysis executed by the natural language processor 50 is performed by a local parser module 52 and a global parser module 54. The details of the natural language processor 50 and its components are described in greater detail below.

It is preferred that the voice controlled multimedia system 10 is incorporated into a set-top decoder box 72. However, the multimedia system 10 can also be incorporated into a television 70, or alternatively into a satellite tuner or video recording/playback device, such as devices 40, 42.

The natural language processor 50 utilizes a plurality of predefined task frames 80 which contain a semantic representation of the tasks associated with the user's spoken request. As shown, the task frames 80 include a recording request task frame 82, a playback request task frame 84 and an A/V library records task frame 86. While only three task frames 80 are shown, it should be understood that many other task frames can be designed for use with the present invention. Moreover, each of the plurality of predefined task frames 80 can be specific to a particular type of program, including but not limited to a record movie task frame, a record news task frame, and a record sports task frame. Each task frame 80 includes a plurality of key word slots 90 for storing the key words which are parsed from the user's spoken request.

A processor based dialogue manager 60 interacts with the various modules of the multimedia system 10, including the natural language processor 50. As shown, the dialogue manager 60 receives the tagged and formatted words from the natural language processor 50. The dialogue manager 60 is capable of reading and analyzing the task frames and then retrieving records 30 from the multimedia database 20 using the search criteria contained in the selected task frame 80. The search function performed by the dialogue manager 60 is assisted by a rule base 62, which will be described in greater detail below. A request history database 64 is maintained by the dialogue manager 60 for storing a history of the user preferences, such as preferred sports or movie types for viewing and/or recording.

The dialogue manager 60 has the ability to provide output to a speech synthesizer 66 which can produce an audible inquiry to the user. The dialogue manager 60 may also provide output to an on screen display (OSD) module 68 for presenting the inquiry to the user via a connected television screen 70. Finally, the dialogue manager 60 can provide output to a signal generator module 74 which can translate the output into the appropriate signal for changing the channel on the television 70 or set-top box 72. It is contemplated that as part of the present invention, the signal generator module 74 can produce a variety of commonly used infrared signals which are compatible with the remote command receiver found on most televisions, cable interface boxes, satellite receivers and video recording devices. In this fashion, the dialogue manager 60 can direct the signal generator module 74 to automatically change the television channel, or even program the video tape recording device to record a program from a desired channel at a particular time and day.

The operation of the natural language processor 50 is shown in FIG. 3. As described above, the natural language processor 50 includes a local parser 52 and a global parser 54 for further analyzing and understanding the semantic content of the digitized words provided by the speech recognizer 48. The local parser 52 has the ability to analyze words, phrases, sentence fragments, and other types of spoken grammatical expressions. To simplify the explanation of the natural language processor 50, all of the grammatical expressions which can be recognized and understood will hereinafter be referred to as "words." Thus, the reference to words should be understood to include phrases, sentence fragments, and all other types of grammatical expressions.

The local parser 52 examines the words using a LR grammar module 56 to determine if the word is a key word or a non-key word. When a word is recognized as a key word, the word (or phrase, etc.) is "tagged" with a data structure which represents the understood meaning of the word. This examination is accomplished using a database of grammar data structures which comprise the vocabulary of the system. Thus, each recognizable word or phrase has an associated grammar data structure which represents the tag for the word. Once the correct grammar data structure is identified by the local parser 52, a tagging data structure for the word is generated, such as tagging data structure 102 or 104, defining the meaning of the word. The goal of the local parser 52 is to tag all of the spoken words, identified as key words, with the appropriate tagging data structure. The goal of the global parser 54 is to place all of the tagged words into the key word slots 90 of a chosen task frame 80.

In operation, the local parser 52 receives each word, and using the LR grammar module 56 retrieves the grammar data structure associated with that word. The grammar data structure for the word will tell the local parser 52 whether or not the word is a key word, and instruct the local parser 52 how to generate the appropriate tagging data structure 102, 104. If the word is not a key word, it is placed into a buffer in case further analysis by the global parser 54 is required. If the word is a key word, the grammar data structure will contain information on how to generate the tagging data structure. If the word is not a key word, the frame tag and slot tag fields will be empty, and the non-key word will be buffered.

This frame and slot tag information allows the global parser 54 to place the key word into the appropriate slot 90 of the appropriate task frame 80. This process is assisted by the frame select and slot filler module 106. In the case of some key words, multiple frames may be applicable, and the tagging data structure 102, 104 will indicate that the same slot 90 of two different task frames should be filled with the same key word. The correct task frame 80 can then be chosen during later iterations by the global parser 54.

An example of a spoken request might be "I would like to record the movie Titanic". This exemplary request contains several key words, namely, "record", "movie" and "Titanic". The remaining words are assumed to be non-key words. However, a dialogue phase may be necessary with this exemplary request in order to resolve the specifics of which program or movie about the Titanic the user would like to record. Alternatively, the user may request to watch a previously recorded movie or listen to a pre-recorded compact disk forming part of the A/V library records 34 within the multimedia database 20.

As part of the present analysis technique, the local parser 52 would individually process the words "I" "would" "like" and "to", determine that these words are non-key words, and place these non-key words into a buffer (not shown). The local parser 52 then retrieves the grammar data structure for the word "record" generates the tagging data structure 102, and tags the word "record" with the tagging data structure. The tagged word is then passed to the global parser 54 which can determine that the user's desired action is to record a program, as opposed to watch a pre-recorded program, or inquire as to what programs are on at a future date and/or time.

The tagging data structure for the word "record", shown as data structure 102, will indicate that the record request task frame 82 should be selected. However, a key word slot 90 will not be designated for the word "record" because this key word is better associated with a specific task frame. The tagging data structure 104 for the word "Titanic" will indicate that the semantic representation of this key word should be placed into the title slot 92 of the task frame. The global parser 54 may assist in deciding that the title slot 92 of the record request task frame 82 should be filled with the understood meaning of the word "Titanic." This way, the dialogue system 16 can recognize that the user wishes to search for programs with the requested title.

At this point, the local parser 52 has tagged all of the words within the spoken request, and the global parser 54, along with the frame select and slot filler module 106, has selected the appropriate task frame 80 for building the search request and has filled the appropriate slots 90 with the understood meaning of the words. Next, the dialogue system 16 can query the user 12 for more specific information in order to fill additional slots 90. The dialogue system 16 knows which questions to ask the user 12 based upon which key word slots 90 within the record request task frame 82 must be filled. For example, if the movie Titanic is scheduled for multiple broadcasts on a given date and channel (i.e. HBO), and the time slot 100 is empty, the dialogue system 16 may ask the user "At what time would you like to record Titanic?". If the user 12 responds with a spoken time, or time range, the local parser 52 will tag the key words relating to time using the technique described above, and the global parser 54 will place these key words into the time slot 100 of the record request task frame 82.

The global parser 54 is primarily responsible for analyzing the tagging data structure generated by the local parser 52, for identifying the meaning of the word within the context of the spoken request, and then placing the meaning of the word in the appropriate key word slot 90. The global parser 54 is comprised of many decision tree structures 58. A particular decision tree 58 is utilized once the context of the spoken command is determined. Each decision tree 58 has a starting point, and terminates at a particular action. The action at the terminus of the decision tree 58 instructs the global parser 54 where to place the word, or how to resolve the particular ambiguity. In the case of the present invention, the action will typically instruct the global parser 54 as to which task frame 80 should be selected, or into which key word slot 90 a particular tagged word should be placed.

A rule base 62 assists the dialogue manager 60 in determining which combinations of filled key word slots 90 provide enough information to perform a search within the multimedia database 20. For example, if the time key word slot 100 of the record request task frame 82 is filled, and the title key word slot 92 is filled, the dialogue manager 60 can search the multimedia database 20 for a movie that meets or is close to the requested criteria. However, if the search produces more than a predetermined number of movies, the dialogue manager 60 may ask the user to refine the request. At this point, the dialogue manager 60 is attempting to fill additional key word slots 90 such as the subject key word slot 94 or genre key word slot 96 within the record request task frame 82. If the user responds with a spoken subject or genre, the local parser 52 will tag the key words relating to the subject or genre using the technique described above. These newly tagged words will then be passed to the global parser 54 and placed into the appropriate slots 90 of the record request task frame 82.

For example, if the user responds with "record the movie Titanic", the global parser 54 will place the word "movie" into the subject slot 94, and again the dialogue manager 60 will narrow its search through the multimedia database 20. If the requested program is found after searching the EPG program records 32, the dialogue manager 60 will instruct the appropriate recording/playback device 40, 42 to begin recording the desired program at is showing time. The start time, duration and channel information can be retrieved from the EPG record 32 stored within the multimedia database 20 as a recording request record 36. Thus, as part of the present invention, the dialogue manager 60 has the ability to create recording request records 36 from completed recording request task frames 82 and store them in the multimedia database 20. These recording request records 36 can then be searched against future EPG program records 32 by the dialog manager 60 for satisfying a queued recording request from the user. If several programs with similar titles or subjects are available, the dialogue manager 60 may list all of the available programs via the OSD module 68. At this point, the user may select the desired program by number or title. As an alternative feature of the present invention, the dialogue manager 60 may provide a confirmation of the user's request as feedback to the user prior to initiating the record function.

As the user learns to provide the dialogue manager 60 with a complete set of information within one spoken request, such as "I would like to watch the Detroit Red Wings vs. Colorado Avalanche hockey game tonight", or "I would like to record the program Nova on PBS this Tuesday", the natural language processor 50 can fill enough key word slots 90 to permit a search to be performed, and the spoken request fully satisfied by the dialogue manager 60. In the case of the request to watch the hockey game, the dialogue manager 60 will complete the search through the A/V library records 34, produce the appropriate signal for prompting the user to load the appropriate media and begin playing back the requested program on the video playback device 40, 42 based upon the information contained within the media/location field of the A/V library record 34. In the case of the request to record the desired program from PBS, the dialogue manager 60 will complete the search and retrieve the date, time and channel information from the EPG programming record 32 and produce the appropriate signal via signal generator module 74 for programming the appropriate video recording device 40, 42. Alternatively, the dialogue manager may directly communicate a signal to begin recording directly to the is video recording device 40, 42.

As part of the present invention, it is further contemplated that the dialogue manager 60 can receive feedback signals from the video recording device 40, 42 in cases where the device is already programmed to record a different program at the same time, or that a blank tape must be inserted into the recording device. In this manner, various conflicts can be resolved while the user is present.

The foregoing discussion discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A method of managing the storing and retrieving of an A/V program stored at an identified location, comprising:

obtaining first information about an A/V program from a user;

obtaining second information about said A/V program automatically from a source of electronic program guide information;

using said first and second information to define text information;

associating in a database said text information with an identified location of said A/V program;

using said text information to dynamically generate a vocabulary;

receiving a spoken request utterance from the user;

processing said utterance using an automatic speech recognition system which utilizes said dynamically generated vocabulary to generate request text;

processing said request text using a natural language parser to extract at least one keyword from said request text;

using said at least one extracted keyword to query said database and to thereby identify for storing or retrieving an A/V program having associated text information that corresponds to said extracted keyword.

2. The method of claim 1 wherein said first information is obtained by receiving a spoken utterance from the user.

3. The method of claim 1 wherein said first information is obtained by manual manipulation of an input device by the user.

4. The method of claim 1 further comprising using a dialogue manager to create recording request records that are stored in said database.

5. The method of claim 4 wherein said database stores electronic program guide records associated with future A/V programs and wherein said dialogue manager uses said stored recording request records to search said future electronic program guide records to identify A/V programs to be recorded.

6. The method of claim 1 wherein said step of parsing said request text using a grammar that identifies a plurality of task frames.

7. The method of claim 1 wherein said step of parsing said request text using a grammar that identifies a plurality of task frames associated with at least one of the following actions: recording, playback and library record management.

8. The method of claim 1 further comprising controlling the recording function of an A/V recording apparatus based on said at least one extracted keyword.

9. The method of claim 8 wherein said controlling step is performed using wireless communication.

10. The method of claim 1 further comprising controlling the playback function of an A/V playback apparatus based on said at least one extracted keyword.

11. The method of claim 10 wherein said controlling step is performed using wireless communication.

* * * * *